United States Patent
Tremblay

(10) Patent No.: US 9,976,612 B2
(45) Date of Patent: May 22, 2018

(54) SINGLE FASTENER BRAKE DISK INSERT RETAINER

(71) Applicant: Goodrich Corporation, Charlotte, NC (US)

(72) Inventor: Nathan Tremblay, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 58 days.

(21) Appl. No.: 14/938,277

(22) Filed: Nov. 11, 2015

(65) Prior Publication Data
US 2017/0130791 A1    May 11, 2017

(51) Int. Cl.
| F16D 65/12 | (2006.01) |
| F16B 5/04 | (2006.01) |
| F16B 43/00 | (2006.01) |
| F16D 65/02 | (2006.01) |

(52) U.S. Cl.
CPC ........... F16D 65/12 (2013.01); F16D 65/123 (2013.01); *F16B 5/04* (2013.01); *F16B 43/00* (2013.01); *F16D 65/125* (2013.01); *F16D 65/126* (2013.01); *F16D 2065/1308* (2013.01); *F16D 2065/1348* (2013.01); *F16D 2065/1372* (2013.01); *F16D 2250/0084* (2013.01)

(58) Field of Classification Search
CPC . F16C 65/12; F16C 2065/1392; F16C 65/123
See application file for complete search history.

(56) References Cited

U.S. PATENT DOCUMENTS

| 3,526,307 A | * | 9/1970 | Falzone | F16D 13/64 188/218 XL |
| 3,550,740 A | * | 12/1970 | Main | F16D 13/648 188/218 XL |
| 3,726,374 A | * | 4/1973 | Warren | F16D 65/121 192/107 R |
| 3,757,907 A | * | 9/1973 | Crossman | F16D 65/121 188/218 XL |
| 3,904,000 A | * | 9/1975 | Berger | F16D 65/121 188/218 XL |
| 3,907,076 A | * | 9/1975 | Crossman | F16D 65/121 188/218 XL |

(Continued)

FOREIGN PATENT DOCUMENTS

GB    2139300    11/1984

OTHER PUBLICATIONS

Extended European Search Report dated Apr. 4, 2017 in European Application No. 16198024.8.

*Primary Examiner* — Anna M Momper
*Assistant Examiner* — Mahbubur Rashid
(74) *Attorney, Agent, or Firm* — Snell & Wilmer L.L.P.

(57) ABSTRACT

System and methods for retaining a clip to a rotor are provided. A retaining system for radially retaining a clip to a rotor may include at least one fastener configured to be at least partially positioned within an axial aperture in a rotor; and a retainer circumferentially surrounding a portion of the fastener protruding axially from the axial aperture, the retainer configured to engage a surface of the clip facing radially outward relative to the rotor when the clip is positioned against the rotor, wherein a perimetrical dimension of the retainer is between 25% and 200% of a perimetrical length of the surface.

17 Claims, 3 Drawing Sheets

(56) References Cited

U.S. PATENT DOCUMENTS

| | | | | | |
|---|---|---|---|---|---|
| 3,927,740 | A | * | 12/1975 | Zarembka | F16D 65/126 188/218 XL |
| 4,013,147 | A | * | 3/1977 | Anderson | F16D 65/121 188/218 XL |
| 4,469,204 | A | * | 9/1984 | Bok | F16D 65/126 188/218 XL |
| 4,511,021 | A | * | 4/1985 | Grider | F16D 65/126 188/218 XL |
| 4,557,356 | A | * | 12/1985 | Petersen | F16D 65/126 188/218 XL |
| 4,645,041 | A | * | 2/1987 | Bass | F16D 65/123 188/218 XL |
| 4,747,473 | A | * | 5/1988 | Bok | F16D 13/64 188/218 XL |
| 4,848,521 | A | * | 7/1989 | Izumine | F16D 65/123 188/18 A |
| 4,863,001 | A | * | 9/1989 | Edmisten | F16D 65/126 188/218 XL |
| 6,302,246 | B1 | * | 10/2001 | Naumann | F16D 65/0006 188/18 A |
| 7,703,584 | B2 | * | 4/2010 | Weiss | F16D 65/12 188/218 XL |
| 7,766,133 | B2 | * | 8/2010 | Cress | F16D 65/126 188/218 XL |
| 8,365,882 | B2 | * | 2/2013 | Kirschner | F16D 65/12 188/218 XL |
| 8,651,247 | B2 | * | 2/2014 | Burgoon | F16D 65/123 188/18 A |
| 2004/0182660 | A1 | * | 9/2004 | Cavagna | F16D 65/123 188/218 XL |
| 2010/0051397 | A1 | * | 3/2010 | Kim | F16D 65/12 188/218 XL |

* cited by examiner

SINGLE FASTENER BRAKE DISK INSERT RETAINER

FIELD

The present disclosure relates generally to brake assemblies and more specifically to systems and methods for retaining a carbon drive lug.

BACKGROUND

Carbon brake disks for aircraft typically use inserts (also referred to as clips) on the drive lugs to increase the strength of the drive lug. "Floating" clip designs use a clip retainer riveted to the carbon to retain the clip in the radial direction, but allow the clip to "float" circumferentially at the disk's outer diameter. The clip retainers add weight and can bow or flex perpendicular to the wear surface of the brake disk due to differences in thermal expansion coefficient.

SUMMARY

Systems and methods for retaining a clip to a rotor are provided. A clip retaining system may comprise: at least one fastener configured to be at least partially positioned within an axial aperture in a rotor; and a retainer circumferentially surrounding a portion of the fastener protruding axially from the axial aperture, the retainer configured to engage a surface of the clip facing radially outward relative to the rotor when the clip is positioned against the rotor, wherein a perimetrical dimension of the retainer is between 25% and 200% of a perimetrical length of the surface.

In various embodiments, the surface of the clip facing radially outward may be located on a tab of the clip, the tab located radially from the retainer. The retainer may comprise at least one of a circular, rectangular, or triangular geometry. The fastener may comprise a rivet. The retainer may comprise a washer. An aperture may be disposed in the retainer, the fastener configured to be received by the aperture. A surface of the retainer may be parallel to the surface of the clip, the surface of the retainer configured to engage the surface of the clip in response to the retainer rotating. The perimetrical dimension of the retainer may be between 75% and 125% of a perimetrical length of the surface. The retainer may be configured to freely rotate. The retainer and the fastener may comprise a single unitary member.

A rotor clip assembly may comprise: a rotor having an axial aperture; a clip with at least one tab having a surface, the clip configured to be coupled to the rotor; at least one fastener configured to be partially positioned within the axial aperture; and a retainer circumferentially surrounding a portion of the fastener, the retainer configured to engage the surface, wherein a perimetrical dimension of the retainer may be between 25% and 200% of a perimetrical length of the surface.

In various embodiments, the tab may be located radially from the retainer. The retainer may comprise at least one of a circular, rectangular, or triangular geometry. The fastener may comprise a rivet. The retainer may comprise a washer. An aperture may be disposed in the retainer, the fastener configured to be received by the aperture. A surface of the retainer may be parallel to the surface, the surface of the retainer configured to engage the surface in response to the retainer rotating. A length of the retainer may be between 75% and 125% of a length of the tab. The retainer may be configured to freely rotate.

A method for retaining a clip to a rotor may comprise: positioning the clip adjacent to the rotor; positioning at least one fastener partially into an axial aperture in the rotor radially outwardly of at least one tab of the clip; and positioning a retainer circumferentially around a portion of the at least one fastener protruding from the axial aperture, a perimetrical dimension of the retainer being between 25% and 200% of a perimetrical length of a surface of the at least one tab.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

In various embodiments, a metal rotor clip may be held in place to a carbon rotor brake disk to prevent the rotor clip from falling away from the rotor during assembly. An aperture may be drilled axially or otherwise disposed into the carbon rotor brake disk to accept a fastener. A retainer may be held against the carbon rotor brake disk by the fastener. The fastener may extend in an axial direction when in an installed position. The retainer may be configured to retain a single rotor clip.

Figure 1A:
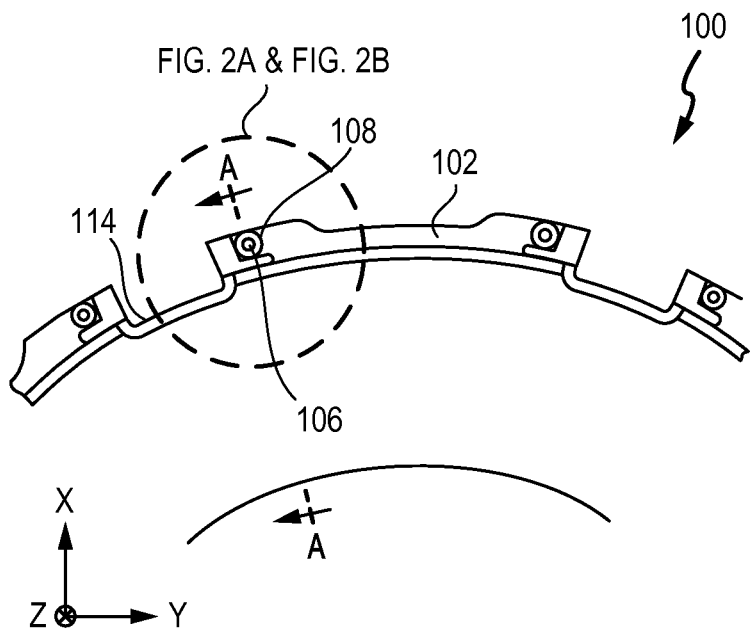
FIG. 1A illustrates, in accordance with various embodiments, a brake disk assembly.

With reference to FIG. 1A, a carbon brake disk assembly 100 is illustrated, in accordance with various embodiments. An xyz axes is provided for ease of illustration. Carbon brake disk assembly 100 may include a carbon rotor disk (also referred to herein as a rotor) 102, at least one clip (also referred to herein as rotor clip) 114, and at least one retainer 108. Rotor clip 114 may be coupled to a radially outward portion of rotor 102 when in an installed position. Retainer 108 may circumferentially surround fastener 106. Fastener 106 may extend in an axial direction (z-direction) when in an installed position as illustrated in FIG. 1A. Fastener 106 and retainer 108 may be referred to herein collectively as a retaining system. Rotor clip 114, fastener 106, and retainer 108 may be referred to herein collectively as a rotor clip assembly.

Figure 1B:
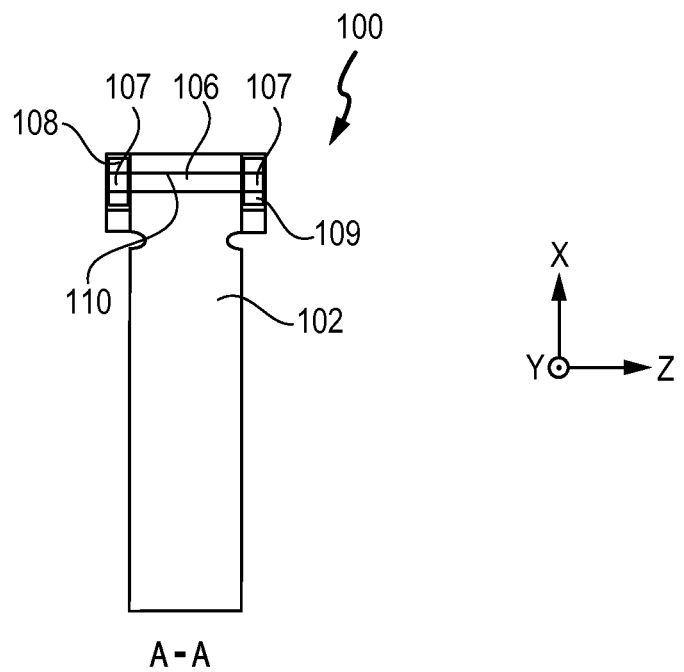
FIG. 1B illustrates, in accordance with various embodiments, a cross-section view of the brake disk assembly of FIG. 1A.

With reference to FIG. 1B, a cross-section view along line A-A of carbon brake disk assembly 100 is illustrated, in accordance with various embodiments. An xyz axes is provided for ease of illustration. An aperture 110 may be disposed in rotor 102. Thus, aperture 110 may comprise a bore or a hole. Aperture 110 may extend in the axial direction (z-direction) through rotor 102. Fastener 106 may be located at least partially in aperture 110 of rotor 102 when in an installed position. A portion 107 of fastener 106 may protrude from aperture 110. Aperture 110 may be an axial aperture. Stated another way, aperture 110 may extend in an axial direction.

A second retainer 109 may be located on the opposite side of rotor 102 as retainer 108 when in an installed position. Second retainer 109 may be similar to retainer 108.

Figure 3:
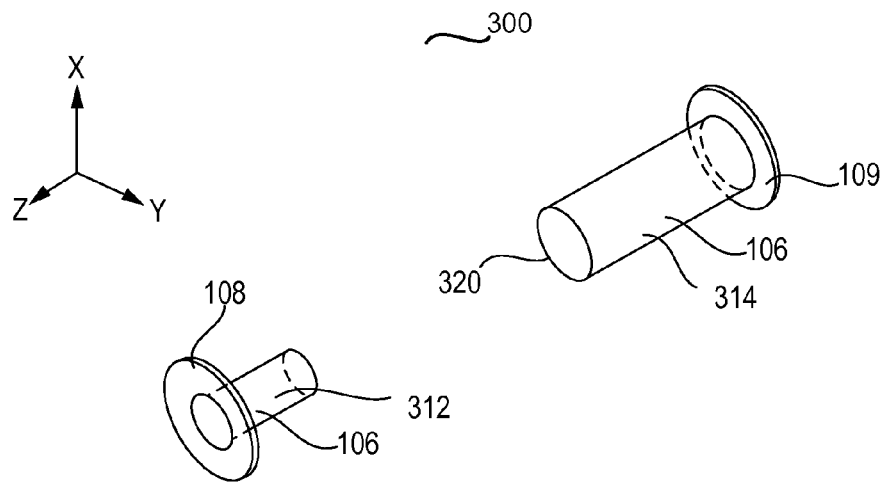
FIG. 3 illustrates, in accordance with various embodiments, a retaining system.

With respect to FIG. 3, elements with like element numbering, as depicted in FIG. 1B, are intended to be the same and will not necessarily be repeated for the sake of clarity.

With reference to FIG. 3, a retaining system 300 is illustrated in accordance with various embodiments. An xyz axes is provided for ease of illustration. In various embodiments, fastener 106 may comprise a first element 312 and a second element 314. In various embodiments, first element 312 may be configured to be received by second element 314. For example, first element 312 may be received by second element 314 via aperture 320 to couple first element 312 to second element 314. Thus, second element 314 may comprise a hollow tube. In various embodiments, retainer 108 may be coupled to second retainer 109 via fastener 106. In various embodiments, retainer 108 and first element 312 may comprise a single piece. In various embodiments, retainer 108 and first element 312 may comprise two separate pieces. In various embodiments, second retainer 109 and second element 314 may comprise a single piece. In various embodiments, second retainer 109 and second element 314 may comprise two separate pieces.

Although described in FIG. 3 as comprising two separate pieces, fastener 106 may comprise a single piece. For example, as mentioned herein, fastener 106 may comprise a rivet configured to be crimped at each end to retain retainer 108 from moving in the positive z-direction. Fastener 106 may comprise a rivet configured to be crimped at each end to retain second retainer 109 from moving in the negative z-direction.

Figure 2A:
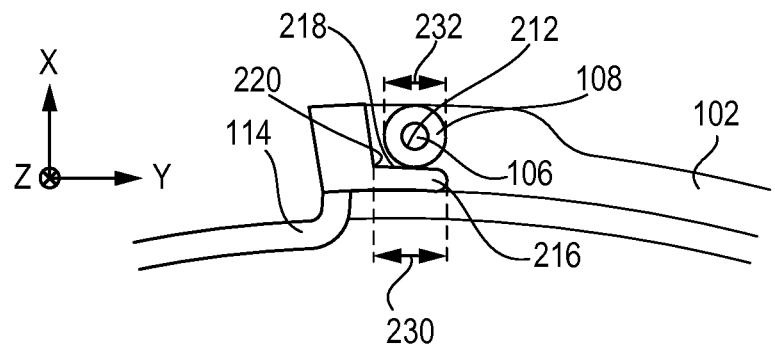
FIG. 2A illustrates, in accordance with various embodiments, a closer view of the carbon brake disk assembly of FIG. 1A is illustrated including a circular retainer.

With reference to FIG. 2A, a closer view of carbon brake disk assembly 100 as illustrated in FIG. 1A is illustrated including a circular retainer, in accordance with various embodiments. An xyz axes is provided for ease of illustration. In various embodiments, rotor clip 114 may include a tab 216 extending from rotor clip 114. Tab 216 may extend in the circumferential direction (y-direction). Retainer 108 may be located radially outward (positive x-direction) from tab 216. In various embodiments, retainer 108 may be configured to engage surface 218 of tab 216. Thus, retainer 108 may prevent rotor clip from moving radially outward. Stated another way, retainer 108 may prevent rotor clip 114 from decoupling with rotor 102.

In various embodiments, an aperture 212 may be disposed in retainer 108. Aperture 212 may be configured to receive fastener 106. Fastener 106 may be located at least partially within aperture 212 when fastener 106 is in an installed position. In various embodiments, retainer 108 may be configured to freely rotate about fastener 106 when in an installed position. As illustrated in FIG. 2A, retainer 108 may comprise a circular geometry. Retainer 108 may comprise and/or be similar to a washer. Fastener 106 may comprise and/or be similar to a rivet.

In various embodiments, surface 218 of tab 216 may comprise a length (also referred to herein as perimetrical length) 230. In various embodiments, retainer 108 may comprise a dimension 232. Dimension 232 may be the perimetrical dimension of retainer 108 as measured in the circumferential direction (y-direction as shown in FIG. 2A). In various embodiments, dimension 232 of retainer 108 may be between 25% and 200% of length 230. In various embodiments, dimension 232 of retainer 108 may be between 75% and 125% of length 230.

Figure 2B:
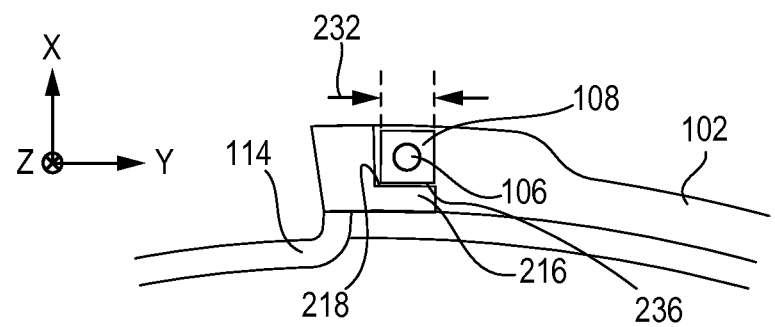
FIG. 2B illustrates, in accordance with various embodiments, a closer view of the carbon brake disk assembly of FIG. 1A is illustrated including a rectangular retainer.

With respect to FIG. 2B, a closer view of carbon brake disk assembly 100 as illustrated in FIG. 1A is illustrated including a rectangular retainer, in accordance with various embodiments. An xyz axes is provided for ease of illustration. In various embodiments, retainer 108 may comprise a rectangular geometry. Retainer 108 may comprise any suitable geometry including circular, rectangular, triangular, and elliptical. Retainer 108 may comprise a radially inward surface 236. As illustrated in FIG. 2B a radially inward surface 236 of retainer 108 may be configured to be parallel to surface 218 of tab 216. In various embodiments, radially inward surface 236 may be configured to contact or engage surface 218 in response to retainer 108 rotating about fastener 106. Thus, tab 216 may prevent retainer 108 from rotating.

Although described herein as retainer 108 and fastener 106 comprising two separate pieces or elements, it is contemplated that retainer 108 and fastener 106 may comprise a single element. Stated another way, retainer 108 and fastener 106 may comprise a single unitary member. Furthermore, fastener 106 may comprise multiple elements. For example, fastener 106 may comprise a 2-piece rivet configured to be compressed together.

In various embodiments, retainer 108 may comprise a steel alloy. Retainer 108 may comprise a metal, such as stainless steel, an austenitic nickel-chromium-based alloy such as Inconel™ which is available from Special Metals Corporation of New Hartford, N.Y., USA, titanium, and other suitable materials. Retainer 108 may comprise a material configured to resist high temperatures of up to 2000° F. Retainer 108 may be manufactured using metal laser sintering, casting, an additive manufacturing process, stamping sheet metal or the like.

Figure 4:
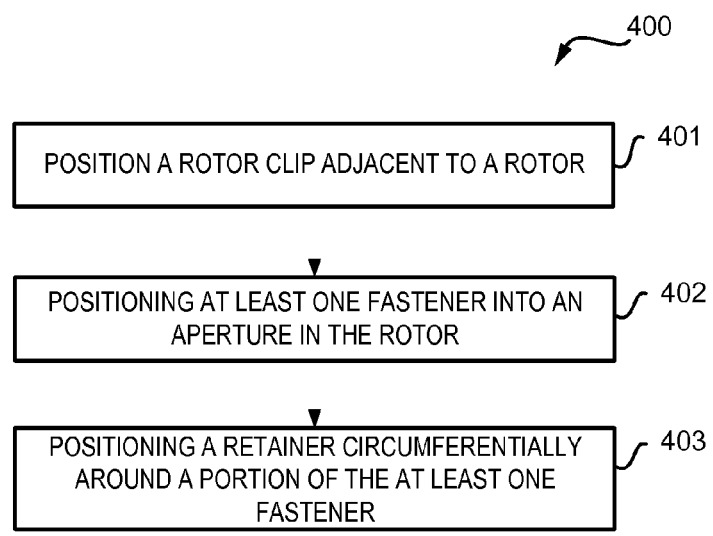
FIG. 4 illustrates, in accordance with various embodiments, a method for retaining a clip to a rotor.

With reference to FIG. 4, a method for retaining a clip to a rotor is provided, in accordance with various embodiments. In various embodiments, method 400 may include positioning a rotor clip adjacent to a rotor (see step 401). Method 400 may include positioning at least one fastener into an aperture in the rotor (see step 402). Method 400 may include positioning a retainer circumferentially around a portion of the at least one fastener (see step 403).

With further reference to FIG. 1B and FIG. 2A, step 401 may include positioning rotor clip 114 adjacent to rotor 102. Rotor clip 114 may be placed over and/or against a radially outward rim of rotor 102. Step 402 may include positioning fastener 106 at least partially into aperture 110 disposed in the rotor 102 radially outwardly of tab 216. Step 403 may include positioning retainer 108 circumferentially around a portion of the fastener 106 protruding from aperture 110.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A clip retaining system comprising:
   at least one fastener configured to be at least partially positioned within an axial aperture in a rotor;
   a rotor clip comprising a tab: and
   a retainer circumferentially surrounding a portion of the fastener protruding axially from the axial aperture, the retainer configured to engage a radially outward facing surface of the tab of the clip relative to the rotor when the clip is positioned against the rotor, wherein
   a perimetrical dimension of the retainer is between 25% and 200% of a perimetrical length of the surface,
   wherein the retainer is circumferentially adjacent and outward of the clip relative to the rotor, such that the clip may at least one of shift or expand circumferentially, and the retainer is radially aligned with the tab and entirely radially outward of the clip, and
   wherein an aperture is disposed in the retainer, and the fastener is configured to be received by the aperture.

2. The retaining system of claim 1, wherein the retainer may contact the radially outward facing surface of the tab of the clip to prevent the clip from decoupling with the rotor.

3. The retaining system of claim 1, wherein the retainer comprises at least one of a circular, rectangular, or triangular geometry.

4. The retaining system of claim 1, wherein the fastener comprises a rivet.

5. The retaining system of claim 1, wherein the retainer comprises a washer.

6. The retaining system of claim 1, wherein a surface of the retainer is parallel to the surface of the clip, the surface of the retainer configured to engage the surface of the clip in response to the retainer rotating.

7. The retaining system of claim 2, wherein the perimetrical dimension of the retainer is between 75% and 125% of a perimetrical length of the surface.

8. The retaining system of claim 1, wherein the retainer is configured to freely rotate.

9. The retaining system of claim 1, wherein the retainer and the fastener comprise a single unitary member.

10. A rotor clip assembly comprising: a rotor having an axial aperture;
    a clip with at least one tab having a radially outward facing surface, the clip configured to be coupled to the rotor;
    at least one fastener configured to be partially positioned within the axial aperture; and a retainer circumferentially surrounding a portion of the fastener, the retainer configured to engage the surface, wherein a perimetrical dimension of the retainer is between 25% and 200% of a perimetrical length of the surface,
    wherein the retainer is circumferentially adjacent and outward of the clip relative to the rotor, such that the clip may at least one of shift or expand circumferentially, and the retainer is radially aligned with the tab and entirely radially outward of the clip, and
    wherein an aperture is disposed in the retainer, and the fastener is configured to be received by the aperture.

11. The rotor clip assembly of claim 10, wherein the tab is located radially from the retainer.

12. The rotor clip assembly of claim 10, wherein the retainer comprises at least one of a circular, rectangular, or triangular geometry.

13. The rotor clip assembly of claim 10, wherein the fastener comprises a rivet.

14. The rotor clip assembly of claim 10, wherein the retainer comprises a washer.

15. The rotor clip assembly of claim 10, wherein a surface of the retainer is parallel to the surface, the surface of the retainer configured to engage the surface in response to the retainer rotating.

16. The rotor clip assembly of claim 10, wherein a length of the retainer is between 75% and 125% of a length of the tab.

17. The rotor clip assembly of claim 10, wherein the retainer is configured to freely rotate.

* * * * *